United States Patent [19]
Hoffman et al.

[11] Patent Number: 5,352,946
[45] Date of Patent: Oct. 4, 1994

[54] LINEAR MOTOR SUSPENSION SYSTEM

[75] Inventors: Brian D. Hoffman, Somerville, N.J.; Steven H. Pollack, Washington Crossing, Pa.; Peter Smit, Newton, Pa.; John Woolley, Warrington, Pa.

[73] Assignee: Megamation Incorporated, Lawrenceville, N.J.

[21] Appl. No.: 13,295

[22] Filed: Feb. 4, 1993

[51] Int. Cl.⁵ .............................................. H02K 41/00
[52] U.S. Cl. .......................................... 310/12; 310/91
[58] Field of Search ............................... 310/12, 14, 91

[56] References Cited

U.S. PATENT DOCUMENTS 4,823,062  4/1989  Hoffman et al. ..................... 318/687
4,949,923  8/1990  Daily ................................ 248/188.3

*Primary Examiner*—Steven L. Stephan
*Assistant Examiner*—Judson H. Jones
*Attorney, Agent, or Firm*—Louis Weinstein

[57] ABSTRACT

Power requirements for a robotic system are achieved through the employment of modular-type linear motor (LM) cells of either the one dimensional or two-dimensional type. Increasing system power requirements are met through the utilization of an increasing number of modular linear motor cells precisely positioned upon a common mounting plate to assure proper operation with a common platen. Deviations in the planarity or flatness of the platen and/or linear motor confronting surfaces due, for example, to warpage, temperature fluctuations, machining considerations or the like, are accommodated by mounting each modular LM cell upon a solid suspension member having mounting legs which are machined or otherwise formed from the solid member so as to be compliant in the Z direction only and non-compliant in the mutually perpendicular X and Y directions thereby allowing for movement in the Z direction as well as rotational movement about the X or Y axes to compensate for warpage or non-planarity of the platen and/or linear motor. Each mounting leg has a boss which is provided to enable the compliant legs to undergo proper flexing due to the displacement of the adjacent mounting surface of the LM, provided for by the bosses.

21 Claims, 2 Drawing Sheets

LINEAR MOTOR SUSPENSION SYSTEM

FIELD OF THE INVENTION

The present invention relates to robotic systems employing linear motors and, more particularly, to a novel suspension system which compensates for warpage and/or other deviations from planarity of the system platen and to a novel linear motor system comprised of a plurality of linear motors employing the novel suspension system.

BACKGROUND OF THE INVENTION

Linear motor systems are well known to the art and have been found to be advantageous for use in robotic systems for use in "pick and place" applications wherein it is desired to locate components upon a substrate with high accuracy. One typical system is shown, for example, in U.S. Pat. No. 4,823,062, issued Apr. 18, 1989 and assigned to the assignee of the present invention.

In one typical embodiment, the robot is mounted upon a linear motor of the two-dimensional type which is movable in two mutually perpendicular directions along a platen. The robot may typically pick up a component from a feeder bin, precisely position the component above a substrate and deposit the component at said position.

Many robotic applications require greater and greater forces dictated by the specific application. The conventional approach to achieve the desired power capability is to produce a linear motor of increasing power and hence of increasing size. This approach has the disadvantage of providing a linear motor having a significantly increased surface area which confronts and interacts with the cooperating surface of the system platen to develop the desired forces to propel the linear motor along the surface of the platen. The increased surface area of the linear motor renders the linear motor more susceptible to deviations between surface areas of the linear motor and the platen due to platen warpage which typically results from limitations in the manufacturing process, the exorbitant costs of producing a platen having near-perfect planarity, temperature changes, and the like, resulting in a loss of power, as well as erratic operating behavior in the linear motor due to the spacing deviations between the interactive surfaces of the linear motor and the platen. Increasing the size of the linear motor also increases the difficulty and cost of producing a planar confronting surface of the linear motor which interacts with the platen further reducing driving power and/or consistency of driving power.

BRIEF DESCRIPTION OF THE INVENTION

The robotic system of the present invention overcomes the aforementioned disadvantages by providing a novel suspension system which is characterized by comprising a system employing linear motors of modular design. Increasing force and/or power requirements are met through the employment of two or more modular type linear motors which are mounted at precise locations upon a common mounting plate.

Warpage and/or deviations from flatness of the platen and/or linear motor are compensated for by providing compliance mounting blocks or attachment members which are securely mounted to the mounting plate, each of the mounting members provided with compliant mounting legs machined out of the compliant attachment member to form beam springs which are designed to provide compliance in the Z direction (i.e., in the direction perpendicular to the working surface of the platen) while being non-compliant in the mutually perpendicular X and Y directions, allowing degrees of freedom in the Z direction, rotation about the Y axis and rotation about the X axis. No compliance is provided in the X direction or Y direction thereby assuring proper alignment between the linear motors and the platen as well as preventing rotation about the Z axis. The compliance allows the combined air bearings of the linear motors to operate properly and independently of one another over a large surface area. The suspension system, which may either be integral to the linear motor cell or may be an added device, allows each linear motor (i.e., LM) cell to operate independently from the other cells to accommodate for platen and/or linear motor surface irregularities thereby allowing each linear motor cell air bearing to independently and properly float the LM cells.

Each beam spring mounting leg has a raised boss to displace the linear motor above the major surface of the compliant attachment block to allow the beam springs to properly flex in the Z direction.

OBJECTS OF THE INVENTION

It is, therefore, one object of the present invention to provide a novel linear motor system in which increasing power requirements are met through the utilization of modular type LM cells mounted upon a common mounting plate.

Still another object of the present invention is to provide a linear motor system in which a plurality of modular type linear motor cells are mounted upon a common mounting plate through the employment of a compliant attachment member which is designed to compensate for surface irregularities of both the common platen and the linear motors.

Still another object of the present invention is to provide a novel linear motor system employing modular type linear motor cells which are precisely positioned upon a common mounting plate through the employment of compliant attachments having mounting legs which function as beam springs and which are designed in such a way as to provide compliance in only one predetermined axial direction while being non-compliant in the remaining mutually perpendicular directions.

Still another object of the present invention is to provide a novel linear motor system in which a plurality of modular type linear motor cells are mounted at predetermined precise positions upon a mounting plate by way of compliance attachment members having cantilevered legs which function as beam springs to provide independent suspension for each linear motor cell to accommodate for deviations from flatness of the common platen and/or linear motor of the linear motor system.

BRIEF DESCRIPTION OF THE FIGURES

The above, as well as other objects of the present invention will become apparent when reading the accompanying description and drawings in which.

DETAILED DESCRIPTION OF THE INVENTION AND PREFERRED EMBODIMENTS THEREOF

Figure 1:
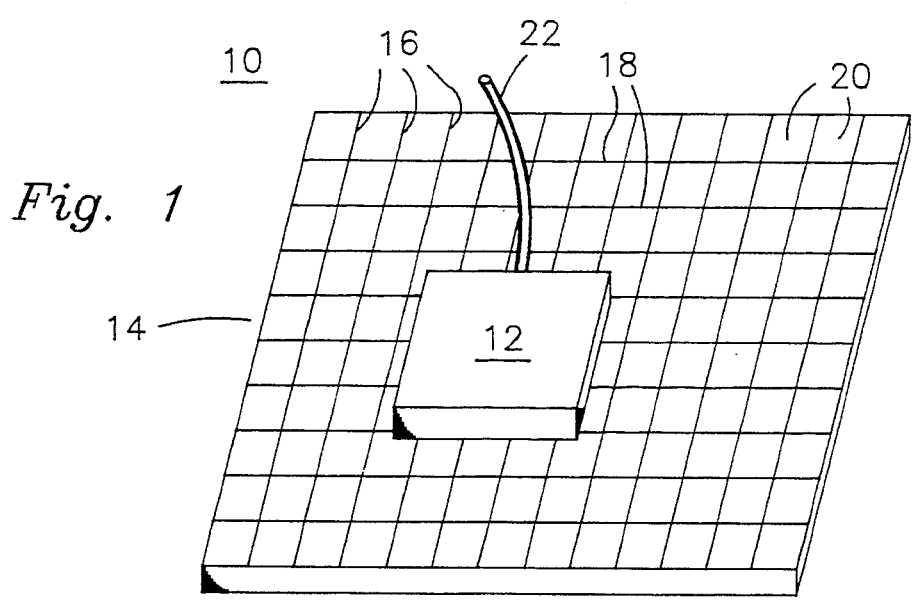
FIG. 1 is a simplified diagram of a conventional linear motor system.

FIG. 1 shows a simplified diagram of a conventional linear motor system 10 comprised of a two-dimensional linear motor 12 cooperating with the working surface of platen 14 provided with a plurality of spaced parallel grooves 16 and a second plurality of spaced parallel grooves 18 perpendicular to grooves 16. The sets of grooves 16 and 18 form substantially square-shaped teeth 20 which cooperate with forcers provided within the two-dimensional linear motor 12 to move the linear motor in mutually perpendicular directions along the surface of platen 14. The grooves 16, 18 are preferably filled with a non-magnetic, insulating material to provide a smooth, flat working surface. An umbilical 22 provides the necessary power to the forcers of linear motor 12. Linear motor 12 is further provided with a source of air coupled through umbilical 22 which develops an air bearing between the confronting surfaces of linear motor 12 and platen 14 causing the linear motor to substantially "float" along a film of air created between the opposing surfaces of the linear motor and the platen.

As was set forth hereinabove, in order to provide a linear motor system of increasing force capability, it is conventional to increase the size of the linear motor forcers and the hence the overall size of the linear motor. This leads to a reduction in motive power and/or synchronism between the linear motor and the platen due to warpage and the like of the confronting surfaces of the platen and/or linear motor.

Figure 2:
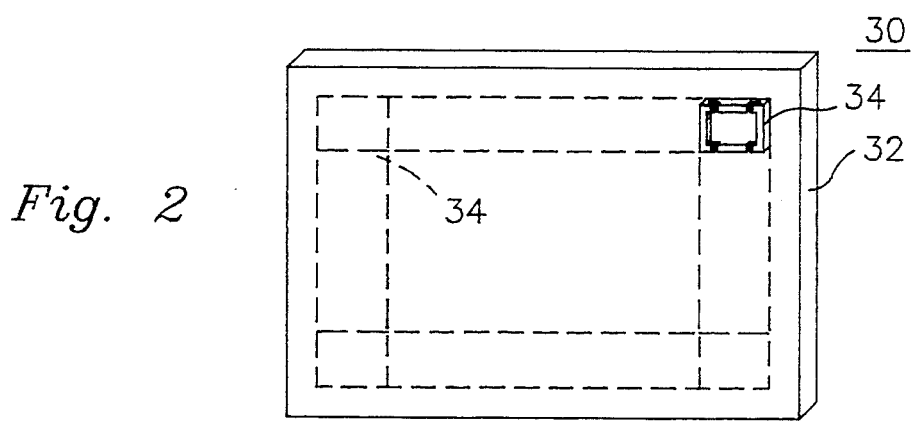
FIG. 2 is a perspective view of showing the invention which is comprised of compliance attachment members mounted upon a common mounting plate.

These disadvantages are overcome in the present invention by providing a suspension system 30 shown in FIG. 2 and comprised of a common mounting plate 32 and a plurality of compliant attachment members 34 arranged in a predetermined pattern upon mounting plate 32 in order to assure proper interaction between the magnetic fields created by the forcers of the group of linear motors and the pattern of teeth provided on the platen.

The force requirements of the system dictate the number of linear motor cells required and hence the size of the mounting plate.

One of the compliance attachment members will be described in detail hereinbelow, it being understood that the compliance members are substantially identical in design and function.

Figure 3:
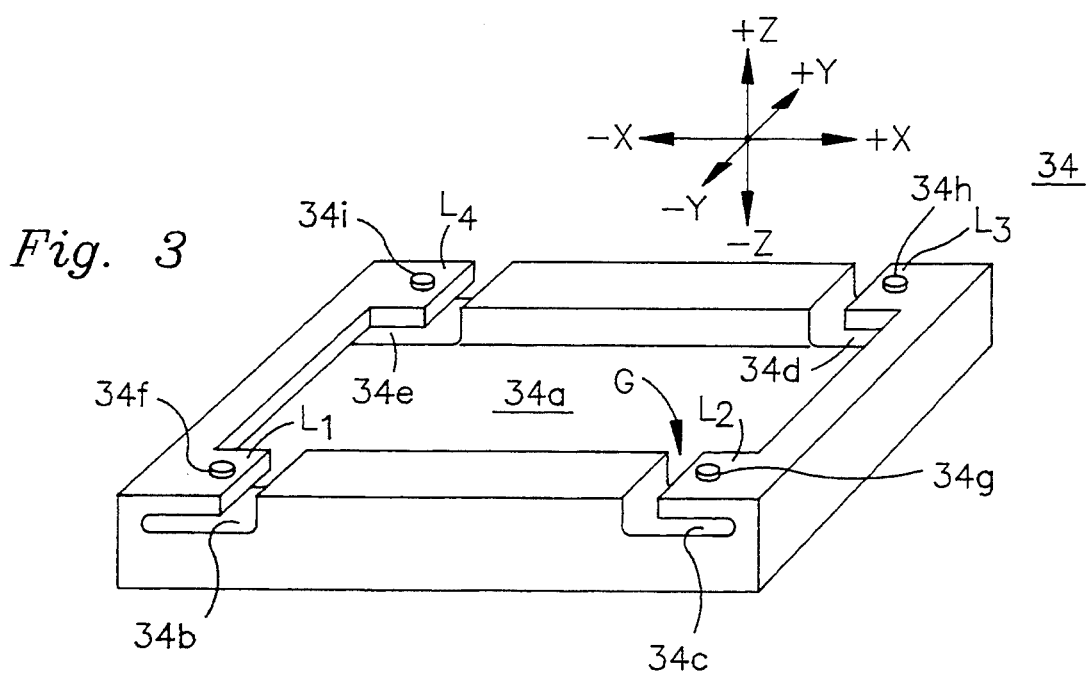
FIG. 3 is a detailed enlarged view of a typical compliance attachment member employed in the arrangement of FIG. 2.

FIG. 3 shows a typical compliance attachment member 34 which may, for example, be formed of a block of aluminum. The block is machined or otherwise formed so as to provide a central recess 34a. Undercut grooves 34b, 34c, 34d and 34e extend beneath and form the compliant legs L1, L2, L3, and L4, respectively. The free end of each of the legs L1 through L4 is spaced from the main body of the attachment member 34 by a gap G causing the legs to be integral with and cantilevered from the main body of member 34.

The compliant attachment points of the legs L1 through L4 provides for compliance in the plus (+) or minus (−) Z direction as well as rotation about the Y axis and rotation about the X axis. However, there is no compliance in the X or Y direction nor is there any capability of rotation about the Z axis.

The compliance block may be an independent block or may be machined into the frame of the linear motor.

Figure 4:
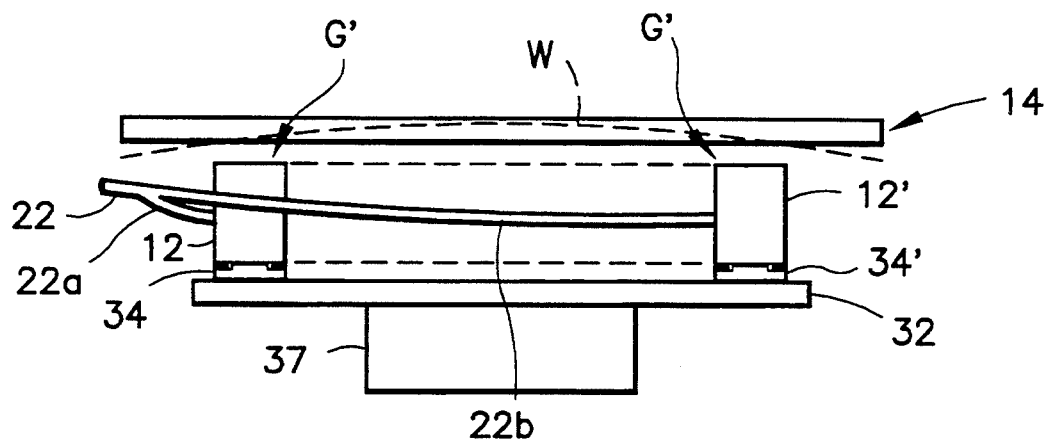
FIG. 4 shows an elevational view of a robotic system employing the mounting arrangement of the present invention.
Figure 4A:
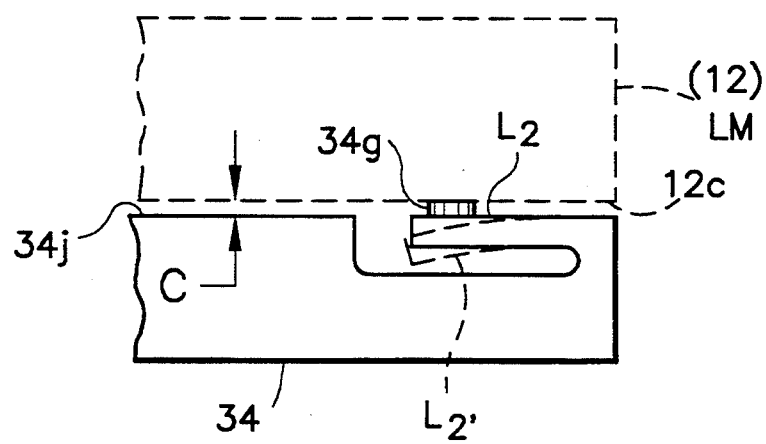
FIG. 4a shows a detailed elevational view of a typical beam spring of the compliance member of FIG. 3.

FIG. 4 shows a simplified elevational view of a linear motor system designed in accordance with the principles of the present invention and being comprised of a platen 14, a plurality of linear motors 12, 12' (only two of which have been shown for purposes of simplicity) each mounted to common mounting plate 32 by a compliance attachment member 34, 34'. A common umbilical 22 is coupled to branch umbilicals 22a, 22b which deliver the appropriate electric, pneumatic and other power needed for the associated linear motor. A manipulation device 37 is mounted upon the surface of common plate 32 opposite the surface upon which the members 34 are mounted. Manipulator 37 may take any one of a variety of forms such as a holding device for holding, releasing and sometimes rotating and/or vibrating a workpiece, such as a screw driver, a device for rotating a screw, a soldering iron for soldering a lead to a terminal, etc.

Gaps G', G" represent the air bearings, i.e. film of air, formed between the linear motors and the surface of platen 14.

Each linear motor is independently suspended from common mounting plate 32 to compensate for any warpage or deviation in flatness of the confronting surface of platen 14 which warpage is represented in FIG. 4 by the curved dotted line W.

Each leg functions as a beam spring having sufficient compliance to yield in the Z direction to accommodate for the aforementioned warpage or the like. Each leg is provided with a raised boss such as, for example, the raised boss 34g provided on leg L2 which provides sufficient clearance to displace the confronting surface 12a of linear motor 12 from the major surface 34j of compliance attachment member 34. For example, assuming the compliant beam spring leg L2 flexes to the dotted position L2', boss 34g permits the desired bending of the beam spring by providing sufficient clearance C between the adjacent surfaces 12a and 34j. Similar bosses 34f, 34h, and 34i are provided on each of the other legs.

Although the compliance member is preferably formed of aluminum, the member may be formed of any suitable metallic or non-metallic material providing equivalent compliance and ruggedness. Alternatively, as was set forth hereinabove, the compliance attachment member may form an integral part of the linear motor housing or alternatively, the compliant beam springs may be formed as an integral part of the common mounting plate.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A mounting system for linear motors and the like comprising:
   a plurality of two-dimensional linear motors;
   a common mounting plate;
   a plurality of compliance attachment members joined to said mounting plate each for attaching an associated linear motor to said mounting plate; and
   each of said attachment members comprising plural means joined to spaced locations on an associated linear motor for providing compliance independently of one another and only in a direction perpendicular to a plane of said mounting plate.

2. The system of claim 1 wherein each of said linear motors is mounted in such a way as to have a driving means extending in a direction of a working surface of a common platen, each of said linear motors including means for providing an air bearing between said linear motor and said platen.

3. A mounting system for linear motors and the like comprising:
   a plurality of linear motors:
   a common mounting plate;
   a plurality of compliance attachment members each for attaching one of said linear motors to said mounting plate;
   each of said attachment members comprising means for providing compliance only in a direction perpendicular to a plane of said mounting plate;
   each compliant attachment member being comprised of a solid block of material having a plurality of integral mounting legs, each of said mounting legs comprising said compliance means and forming a beam spring.

4. The system of claim 1 wherein said compliance attachment member is formed of aluminum.

5. The system of claim 3 wherein each compliance attachment member is provided with at least three beam springs.

6. The system of claim 3 wherein each of said legs is provided with a raised boss to provide a clearance gap between adjacent mounting surfaces of said linear motor and said compliance mounting member to permit the beam springs to undergo proper flexing.

7. The system of claim 1 wherein said compliance attachment member is an integral part of said mounting plate.

8. The system of claim 1 wherein said compliance attachment member is an integral part of said linear motor.

9. The system of claim 1 further comprising manipulator means mounted upon a surface of said mounting plate opposite a surface upon which the compliance attachment members are mounted for performing a predetermined robotic function.

10. A linear motor system mounting means comprising:
    a plurality of two-dimensional linear motors;
    a common mounting plate;
    compliance mounting means each joined to said common mounting plate and resiliently mounting an associated linear motor to said common mounting plate;
    said compliance means providing compliance only in a predetermined direction perpendicular to a plane of said mounting plate while preventing compliance in mutually perpendicular directions to said predetermined direction.

11. The system of claim 10 wherein said linear motor system further comprises a common platen;
    each of said linear motors having forcer means cooperating with said platen to move said linear motor and hence said common mounting plate in mutually perpendicular directions according to control signals applied to said forcer means; and
    said compliance mounting members being arranged at locations which appropriately align all of said forcer means with the cooperating platen to insure proper movement of the linear motors relative to said platen under control of signals driving said forcer means.

12. The of claim 10 further comprising manipulation means mounted to said common mounting plate upon a surface of said mounting plate opposite a surface upon which the compliance attachment members are mounted for performing a robotic function.

13. A linear motor system mounting means comprising:
    a plurality of linear motors;
    a common mounting plate;
    compliance mounting means each resiliently mounting one of said linear motors to said common mounting plate;
    said compliance means providing compliance only in a predetermined direction perpendicular to a plane of said mounting plate while preventing compliance in mutually perpendicular directions to said predetermined direction:
    said compliance mounting means being a mounting member comprised of a block, said compliance means comprising a plurality of compliance members integral with said block; and
    said compliance members being defined by undercut grooves provided in said block to form compliant beam springs cantilevered from a main body of said block.

14. The system of claim 13 further comprising projecting bosses provided on each of said compliance member beam springs to provide proper clearance between confronting surfaces of said linear motors and said compliance mounting block to permit proper flexing of said compliance means.

15. The system of claim 1 wherein said plurality of linear motors are of a common given size.

16. The system of claim 1 wherein said linear motors are mounted in a uniform array comprised of a plurality of rows and columns which are perpendicular to one another.

17. The system of claim 1 further comprising a manipulation device mounted upon said common mounting plate for movement thereby.

18. The system of claim 1 wherein the means for providing compliance for each attachment member comprises at least three compliant arms secured to three locations on its associated linear motor.

19. The system of claim 1 wherein the compliant arms flex independently of one another.

20. The system of claim 1 further comprising means for operating the linear motors so as to function as the equivalent of a conventional two-dimensional linear motor having motive power which is the sum of the totality of motors mounted upon said common mounting plate.

21. The system of claim 1 wherein said means for providing compliance include means which flex independently of one another to enable the linear motors to yield due to irregularities in the linear motor and in a common platen along which the linear motor system is propelled.

* * * * *

UNITED STATES PATENT AND TRADEMARK OFFICE
CERTIFICATE OF CORRECTION

PATENT NO. : 5,352,946
DATED : October 4, 1994
INVENTOR(S) : Brian D. Hoffman, Steven H. Pollack, Peter Smit and John Woolley It is certified that error appears in the above-indentified patent and that said Letters Patent is hereby corrected as shown below:

Column 4, line 29, change "G´, G´´" to --G´, G´--.

Column 6, line 1 of Claim 12, after "The" insert --system--.

Signed and Sealed this

Eleventh Day of April, 1995

Attest:

BRUCE LEHMAN

Attesting Officer

Commissioner of Patents and Trademarks